(12) United States Patent
Murayama et al.

(10) Patent No.: US 10,350,784 B2
(45) Date of Patent: Jul. 16, 2019

(54) SHEET MANUFACTURING APPARATUS

(71) Applicant: SEIKO EPSON CORPORATION, Tokyo (JP)

(72) Inventors: Yoshiaki Murayama, Nagano (JP); Shunichi Seki, Nagano (JP); Katsuhito Gomi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 15/112,477

(22) PCT Filed: Sep. 26, 2014

(86) PCT No.: PCT/JP2014/004935
§ 371 (c)(1),
(2) Date: Jul. 19, 2016

(87) PCT Pub. No.: WO2015/128912
PCT Pub. Date: Sep. 3, 2015

(65) Prior Publication Data
US 2016/0332325 A1 Nov. 17, 2016

(30) Foreign Application Priority Data

Feb. 26, 2014 (JP) .................................. 2014-035040

(51) Int. Cl.
*B27N 3/04* (2006.01)
*D21B 1/06* (2006.01)
(Continued)

(52) U.S. Cl.
CPC ................. *B27N 3/04* (2013.01); *B27N 1/00* (2013.01); *B27N 1/02* (2013.01); *B27N 3/002* (2013.01);
(Continued)

(58) Field of Classification Search
None
See application file for complete search history.

(56) References Cited

U.S. PATENT DOCUMENTS 1,783,969 A * 12/1930 Millspaugh ............... D21F 9/00
162/304
1,783,970 A * 12/1930 Millspaugh ............... D21F 9/00
162/304
(Continued)

FOREIGN PATENT DOCUMENTS

JP 04-504287 A 7/1992
JP 2001-146668 A 5/2001
(Continued)

*Primary Examiner* — Jacob T Minskey
*Assistant Examiner* — Baileigh Kate Darnell

(57) ABSTRACT

A sheet manufacturing apparatus can process various materials and manufacture a variety of sheets by changing conditions for making the sheets. A sheet manufacturing apparatus according to the invention has a supply unit that supplies feedstock; a defibrating unit that defibrates the feedstock; a classifier that classifies defibrated material that past the defibrating unit; a mixing unit that mixes an additive containing resin with the classified material that past the classifier; a sieve unit that passes the mixture that past the mixing unit through many openings; a deposition unit that deposits precipitate that past many openings in the sieve unit; a forming unit that applies pressure and heat to the web deposited on the deposition unit, forming a sheet; and a control unit that changes a condition of at least one of the classifier, mixing unit, sieve unit, deposition unit, and forming unit.

6 Claims, 3 Drawing Sheets

(51) Int. Cl.
*D21F 9/00* (2006.01)
*B27N 1/02* (2006.01)
*D01G 25/00* (2006.01)
*B27N 1/00* (2006.01)
*B27N 3/00* (2006.01)
*D04H 1/4274* (2012.01)
*D04H 1/60* (2006.01)

(52) U.S. Cl.
CPC ........... *D01G 25/00* (2013.01); *D04H 1/4274* (2013.01); *D04H 1/60* (2013.01); *D21B 1/06* (2013.01); *D21F 9/00* (2013.01)

(56) References Cited

U.S. PATENT DOCUMENTS

| | | | | |
|---|---|---|---|---|
| 2,221,200 | A * | 11/1940 | Perry | D21F 9/00 162/116 |
| 2,757,150 | A * | 7/1956 | Heritage | B27N 3/14 162/11 |
| 5,057,166 | A | 10/1991 | Young, Sr. et al. | |
| 5,064,689 | A | 11/1991 | Young, Sr. et al. | |
| 5,302,332 | A * | 4/1994 | Simola | D04H 1/4209 264/115 |
| 5,419,498 | A * | 5/1995 | Rasmussen | D21B 1/08 241/280 |
| 8,882,965 | B2 | 11/2014 | Yamagami et al. | |
| 9,194,081 | B2 | 11/2015 | Yamagami | |
| 2007/0292217 | A1 | 12/2007 | Karpik | |
| 2011/0060133 | A1* | 3/2011 | Medoff | B27K 5/003 530/500 |
| 2011/0190425 | A1* | 8/2011 | Swift | C08J 5/04 524/35 |
| 2011/0293911 | A1* | 12/2011 | Coates | B32B 5/26 428/220 |
| 2013/0168005 | A1* | 7/2013 | Horowitz | B27N 3/04 156/64 |
| 2014/0027075 | A1* | 1/2014 | Yamagami | D21B 1/08 162/4 |

FOREIGN PATENT DOCUMENTS

| | | | |
|---|---|---|---|
| JP | 2003-520912 A | 7/2003 | |
| JP | 2012-144819 A | 8/2012 | |
| JP | 2012-144825 A | 8/2012 | |
| JP | 2013-147772 A | 8/2013 | |
| WO | 01/54873 A1 | 8/2001 | |
| WO | WO-2012095928 A1 * | 7/2012 | ................. D21B 1/08 |

* cited by examiner

| | SUPPLY UNIT | SHREDDER | DEFIBRATING UNIT | CLASSIFIER | SEPARATOR | MIXING UNIT | SIEVE UNIT | DEPOSITION UNIT | FORMING UNIT | | PRODUCT |
|---|---|---|---|---|---|---|---|---|---|---|---|
| | | | | | | | | | calender | heat unit | |
| Example 1 | recovered paper | shredder | defibrator 5000 rpm | cyclone | rotary sieve 970 μm screen opening | additive supply unit 1 fiber: 100 PBW resin: 15 PBW | rotary sieve 970 μm screen opening | normal | calender rollers: 1 set | heat roller: 1 set | office paper |
| Example 2 | recovered paper | shredder | defibrator 5000 rpm | cyclone | rotary sieve 970 μm screen opening | additive supply unit 2 fiber: 100 PBW blue resin: 15 PBW | rotary sieve 970 μm screen opening | normal | calender rollers: 1 set | heat roller: 1 set | blue paper |
| Example 3 | pulp sheet | shredder | defibrator 5000 rpm | — | — | additive supply units 3, 4 fiber: 100 PBW resin: 15 PBW flame retardant: 5 PBW | rotary sieve 3000 μm screen opening | normal | — | heat roller: 3 sets | waste ink sponge, oil sponge, sound/heat insulation |
| Example 4 | pulp sheet | shredder | defibrator 5000 rpm | — | — | additive supply units 3, 4 fiber: 100 PBW resin: 15 PBW flame retardant: 5 PBW | rotary sieve 5000 μm screen opening | normal | — | heat roller: 3 sets | waste ink sponge, oil sponge, sound/heat insulation |
| Example 5 | recovered paper | shredder | defibrator 5000 rpm | — | — | additive supply units 3, 4 fiber: 100 PBW resin: 15 PBW flame retardant: 5 PBW | rotary sieve 3000 μm screen opening | normal | — | heat roller: 3 sets | waste ink sponge, oil sponge, sound/heat insulation |
| Example 6 | recovered paper | shredder | defibrator 5000 rpm | cyclone | — | additive supply units 3, 4 fiber: 100 PBW resin: 15 PBW flame retardant: 5 PBW | rotary sieve 3000 μm screen opening | normal | — | heat roller: 3 sets | waste pigment ink sponge |
| Example 7 | recovered paper | shredder | defibrator 5000 rpm | cyclone | — | additive supply units 3, 4 fiber: 100 PBW resin: 15 PBW flame retardant: 5 PBW | rotary sieve 3000 μm screen opening | normal | — | heat roller: 1 set | waste ink sponge, oil sponge, sound/heat insulation |
| Example 8 | recovered paper | shredder | defibrator 5000 rpm | — | — | additive supply units 3, 4 fiber: 100 PBW resin: 15 PBW flame retardant: 5 PBW | rotary sieve 3000 μm screen opening | 2X | — | heat roller: 3 sets | waste ink sponge, oil sponge, sound/heat insulation |
| Example 9 | recovered paper | shredder | defibrator 5000 rpm | — | — | additive supply unit 3 fiber: 100 PBW resin: 15 PBW | rotary sieve 3000 μm screen opening | 2X | — | heat roller: 2 sets | cleaning tissue |
| Example 10 | recovered paper | shredder | defibrator 5000 rpm | — | — | additive supply unit 3 fiber: 100 PBW resin: 25 PBW | rotary sieve 3000 μm screen opening | 2X | — | heat roller: 3 sets | cleaning tissue for oil |
| Example 11 | old clothing (polyester) | shredder | defibrator 6000 rpm | — | — | additive supply unit 3 fiber: 100 PBW resin: 20 PBW | rotary sieve 3000 μm screen opening | 2X | — | heat roller: 2 sets | cleaning tissue |

FIG. 3

SHEET MANUFACTURING APPARATUS

TECHNICAL FIELD

The present invention relates to a sheet manufacturing apparatus.

BACKGROUND

Conventional sheet manufacturing apparatuses use a wet process in which feedstock containing fiber is soaked in water and then defibrated and repulped by primarily mechanical means. Such wet process sheet manufacturing apparatuses require a large amount of water and large-scale equipment. Maintenance of a water treatment facility is also time-consuming, and significant energy is required for a drying process. Dry-process sheet manufacturing apparatuses requiring little water have therefore been proposed to reduce device size and save energy.

For example, PTL 1 describes a paper recycling apparatus that defibrates shredded paper into fibers in a dry defibrator and makes paper. PTL 2 describes an apparatus for manufacturing insulation containing three-dimensional structures of nonwoven cloth containing short fibers.

CITATION LIST

Patent Literature

[PTL 1] JP-A-2012-144819
[PTL 2] JP-A-2001-146668

SUMMARY OF INVENTION

Technical Problem

Because the material added to the feedstock fiber, the heat and pressure conditions for forming paper and nonwoven cloth, and the length of fiber that is used are different for making paper and nonwoven cloth, making paper and nonwoven cloth with the same (single) manufacturing apparatus is difficult.

An objective of several embodiments of the invention is to provide a sheet manufacturing apparatus capable of using a variety of materials and manufacturing a variety of sheets by changing the conditions for manufacturing sheets.

Solution to Problem

The invention is directed to solving at least part of the foregoing problem, and can be embodied by the embodiments and examples described below.

A sheet manufacturing apparatus comprising: a supply unit that supplies feedstock; a defibrating unit that defibrates the feedstock; a classifier that classifies defibrated material that past the defibrating unit; a mixing unit that mixes an additive containing resin with classified material that past the classifier; a sieve unit that passes the mixture that past the mixing unit through numerous openings; a deposition unit that deposits precipitate that past numerous openings of the sieve unit; a forming unit that applies heat and pressure to the web deposited in the deposition unit, and forms a sheet; and a control unit that changes a condition of at least one of the classifier, mixing unit, sieve unit, deposition unit, and forming unit.

The sheet manufacturing apparatus thus comprised can process a variety of materials and manufacture a variety of sheets by changing conditions for making the sheets. Specifically, the sheet manufacturing apparatus can manufacture sheets with different characteristics using the same materials, and can manufacture sheets having the same characteristics using different materials.

In the sheet manufacturing apparatus of the invention, the forming unit can change at least one of the applied pressure and the heating temperature, and the control unit variably controls at least one of the applied pressure and the heating temperature.

Because the sheet manufacturing apparatus can change at least one of the applied pressure and the heating temperature, the thickness and density of the manufactured sheets can be changed in a single manufacturing apparatus.

In the sheet manufacturing apparatus of the invention, the deposition unit has a conveyor unit that moves while the precipitate is deposited thereon, and the control unit variably controls the speed of the conveyor unit.

Because the sheet manufacturing apparatus can change the speed of the conveyor unit, the thickness and density of the manufactured sheets can be changed in a single manufacturing apparatus.

In the sheet manufacturing apparatus of the invention, the mixing unit can mix different additives, and the control unit causes the mixing unit to select and mix one of the different additives.

Because the sheet manufacturing apparatus can mix different additives with defibrated material, sheets with different characteristics can be manufactured using the same materials in a single manufacturing apparatus.

In the sheet manufacturing apparatus of the invention, the sieve unit has a first sieve unit with mesh of a first size, and a second sieve with mesh of a second size that is larger than the first size; and the control unit selects the first sieve or the second sieve.

Because the sheet manufacturing apparatus can change the size of the screen openings of the sieve unit, the fiber length of the defibrated material passing the sieve unit can be changed, and the strength and density of the manufactured sheets can be changed in a single production apparatus.

In the sheet manufacturing apparatus of the invention, the classifier has a classifying unit that classifies material, a conveyance channel that passes the classifying unit, and a conveyance channel that does not pass the classifying unit; and the control unit selects the conveyance channel passing the classifying unit or the conveyance channel not passing the classifying unit.

The sheet manufacturing apparatus passes the material through the classifier when the feedstock is recovered paper containing material that should be removed, and does not pass the material through the classifier when the feedstock does not contain material that should be removed. The sheet manufacturing apparatus can therefore manufacture sheets from different kinds of feedstock using conditions appropriate to the feedstock that is used.

BRIEF DESCRIPTION OF DRAWINGS

FIG. 3 is a table of the manufacturing conditions and products manufactured in various examples.

DESCRIPTION OF EMBODIMENTS

Preferred embodiments of the invention are described below with reference to the accompanying figures. Note that the embodiments described below do not unduly limit the scope of the invention described in the accompanying claims. All configurations described below are also not necessarily essential elements of the invention.

1. Sheet Manufacturing Apparatus 1.1 Configuration

Figure 1:
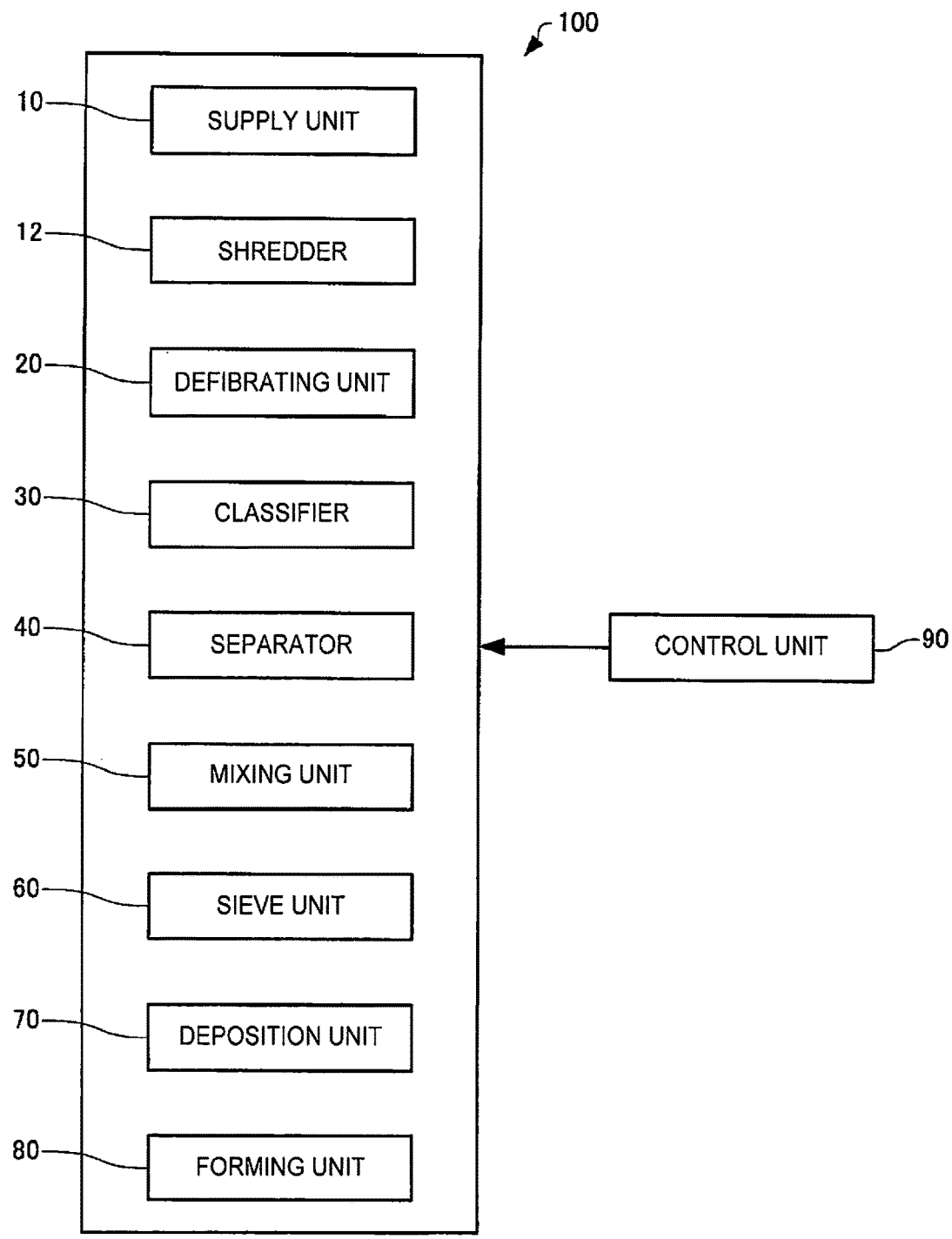
FIG. 1 is a function block diagram of a sheet manufacturing apparatus according to an embodiment of the invention.
Figure 2:
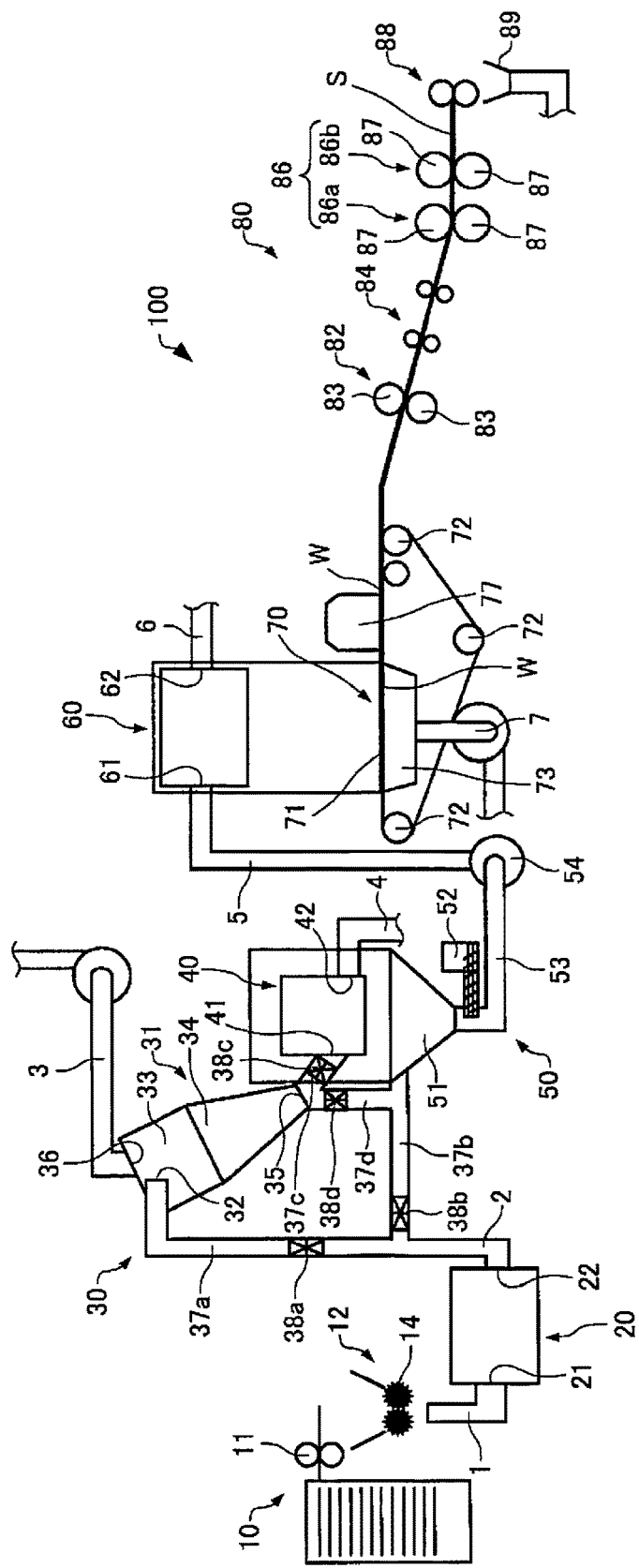
FIG. 2 schematically illustrates a sheet manufacturing apparatus according to an embodiment of the invention.

A sheet manufacturing apparatus according to this embodiment is described below with reference to the accompanying figures. FIG. 1 is a function block diagram of a sheet manufacturing apparatus 100 according to this embodiment of the invention. FIG. 2 illustrates a sheet manufacturing apparatus 100 according to this embodiment of the invention.

As shown in FIG. 1 and FIG. 2, the sheet manufacturing apparatus 100 includes a supply unit 10, shredder 12, defibrating unit 20, classifier 30, separator 40, mixing unit 50, sieve unit 60, deposition unit 70, forming unit 80, and control unit 90. Note that for convenience, the control unit 90 is not shown in the figures.

The supply unit 10 supplies feedstock (raw material) to the shredder 12. The supply unit 10 is, for example, an automatic loader for continuously supplying feedstock material to the shredder 12. The configuration of the supply unit 10 is not specifically limited as long as it can supply material to the shredder 12. The material supplied by the supply unit 10 includes, for example, pulp sheets, paper, used paper, tissue paper, kitchen paper, cleaning paper, filter paper, liquid absorption materials, sound absorption materials, cushioning materials, mats, cardboard, and other products comprising interlocked or bonded fibers. The feedstock may also contain fiber (organic fiber, inorganic fiber, and blends of organic and inorganic fibers) made of rayon, Lyocell, cupro, Vinylon, acrylic, nylon, aramid, polyester, polyethylene, polypropylene, polyurethane, polyimide, carbon, glass, or metal.

The shredder 12 cuts feedstock supplied by the supply unit 10 in air into shreds. While the shape and size of the shreds are not specifically limited, the shreds are preferably a few centimeters square. In the example in FIG. 2, the shredder 12 has shredder blades 14, and shreds the supplied feedstock by the shredder blades 14. In this example, a paper shredder is used as the shredder 12. The material shredded by the shredder 12 is conveyed to the defibrating unit 20 through a conduit 1.

The defibrating unit 20 defibrates the material shredded by the shredder 12. The defibrating unit 20 also functions to separate particulate such as resin, ink, toner, and sizing agents in the feedstock from the fibers. Defibration is a process of separating feedstock (material to be defibrated) comprising interlocked fibers into individual fibers. Material that has past through the defibrating unit 20 is referred to as defibrated material. In addition to untangled fibers, the defibrated material may also contain resin particles (resin used to bind multiple fibers together) and ink particles such as ink, toner, and sizing agents, that are separated from the fibers when the fibers are detangled. The detangled defibrated material is shaped like a string or ribbon. The defibrated material that was detangled may exist separately from (not interlocked with) other detangled fibers, or may be in lumps interlocked with other detangled defibrated material (in so-called fiber clumps).

The defibrating unit 20 defibrates in a dry process in air (air). A dry process as used herein means processing in air (air) and not liquid. "Dry" encompasses a dry state, and the presence of liquids that are present as impurities, and liquids that are intentionally added.

The configuration of the defibrating unit 20 is not specifically limited, and in one example has a rotating unit (rotor) and a stationary unit covering the rotating unit with a space (gap) between the rotating unit and the stationary unit. When the defibrating unit 20 is thus comprised, defibration occurs when the rotating unit is turning and feedstock is introduced to this gap. More specifically, an impeller mill is used as the defibrating unit 20.

The defibrating unit 20 is preferably also able to produce an air current to suction the feedstock and discharge the defibrated material. In this configuration, the defibrating unit 20 suctions the feedstock together with the air flow from the inlet port 21, defibrates the material, and then conveys the defibrated material to the outlet port 22 using the air flow produced by the defibrating unit 20. If a defibrating unit 20 without a mechanism for producing an air flow is used, a mechanism for producing an air flow that carries the feedstock to the inlet port 21, and an air flow that discharges the defibrated material from the outlet port 22, may be disposed externally. Defibrated material that past the defibrating unit 20 is conveyed through a conduit 2 to the classifier 30.

The classifier 30 classifies the defibrated material that past the defibrating unit 20. The classifier 30 includes, for example, a classifying unit 31, a first conveyance channel (conduit) 37a, a second conveyance channel 37b, a third conveyance channel 37c, and a fourth conveyance channel 37d.

The classifying unit 31 performs a classification process. The classification process separates and removes relatively small or low density material (resin particles and ink particles, for example) from the defibrated material. As a result, the percentage of relatively large or high density material in the defibrated material can be increased. The classifying unit 31 is preferably an air classifier. An air classifier produces a helical air flow, and uses centrifugal force to separate the material being classified by the size and density of the material, and the cut point can be adjusted by adjusting the speed of the air flow and the centrifugal force. More specifically, a cyclone, elbow-jet or eddy classifier, for example, may be used as the classifying unit 31. A cyclone is particularly well suited as the classifying unit 31 because of its simple construction. A configuration using a cyclone as the classifying unit 31 is described below.

The classifying unit 31 has an inlet 32, a cylinder 33 connected to the inlet 32, an inverted conical section 34 located below the cylinder 33 and connected continuously to the cylinder 33, a bottom discharge port 35 disposed in the bottom center of the conical section 34, and a top discharge port 36 disposed in the top center of the cylinder 33.

In the classifying unit 31, the air flow carrying the defibrated material introduced from the inlet 32 changes to a circular air flow in the cylinder 33. As a result, centrifugal force is applied to defibrated material introduced to the classifying unit 31, and fibers that are larger and higher in density than the resin particles and ink particles in the defibrated material can be separated from the resin particles and ink particles in the defibrated material that are smaller and have lower density than the fiber in the defibrated material. The high fiber content portion is discharged from the bottom discharge port 35 and introduced to the separator 40. Resin particles and ink particles are discharged to the outside of the classifying unit 31 through a conduit 3 from the top discharge port 36. Because resin particles and ink particles are discharged to the outside by the classifying unit 31, an excessive amount of resin relative to defibrated material can be prevented even if resin is later added by an additive supply unit 52.

Note that the classifying unit 31 cannot completely separate the fiber and fine particulate. For example, relatively small and relatively low density fiber may be discharged externally with the fine particles. Relatively high density particles and particles interlocked with fiber may also be discharged downstream with the fiber.

The first conveyance channel 37a of the classifier 30 connects the conduit 2 connected to the defibrating unit 20 to the classifying unit 31. Defibrated material passing through the first conveyance channel 37a is carried to the classifying unit 31. More specifically, the first conveyance channel 37a is a channel through the classifying unit 31. A first valve 38a that opens and closes the first conveyance channel 37a is disposed to the first conveyance channel 37a.

The second conveyance channel 37b of the classifier 30 connects the conduit 2 connected to the defibrating unit 20 to a funnel-shaped conveyance unit 51. Defibrated material that passes through the second conveyance channel 37b is not conveyed to the classifying unit 31 and separator 40. More specifically, the second conveyance channel 37b does not pass the classifying unit 31 and separator 40. A second valve 38b that opens and closes the second conveyance channel 37b is disposed to the second conveyance channel 37b.

The third conveyance channel 37c of the classifier 30 connects the classifying unit 31 and separator 40. Classified material that was classified and past the classifier 30 and passes the third conveyance channel 37c is conveyed to the separator 40. A third valve 38c that opens and closes the third conveyance channel 37c is disposed to the third conveyance channel 37c.

The fourth conveyance channel 37d of the classifier 30 connects the classifying unit 31 and second conveyance channel 37b. Classified material that was classified and past by the classifier 30 and passes through the fourth conveyance channel 37d and second conveyance channel 37b is conveyed to the funnel-shaped conveyance unit 51. The fourth conveyance channel 37d does not pass through the separator 40. A fourth valve 38d that opens and closes the fourth conveyance channel 37d is disposed to the fourth conveyance channel 37d.

Note that material that past through the classifier 30 is referred to as classified material regardless of whether it passes through the classifying unit 31 or not. In other words, material that past through the second conveyance channel 37b may also be referred to as classified material herein. The classified material is converged by passing through the funnel-shaped conveyance unit 51.

The separator 40 selects fibers by length from the classified material introduced from the inlet 41. A sieve (sifter) can be used as the separator 40. The separator 40 has mesh (filter, screen), and separates fiber or particles smaller than the size of the openings in the mesh (that pass through the mesh) from fiber, undefibrated shreds, and clumps that are larger than the openings in the mesh (that do not pass through the mesh). Material that passes the mesh is conveyed to the mixing unit 50, and material that does not pass the mesh is collected through the conduit 4 from the discharge port 42. Material that does not pass the mesh may be returned to the defibrating unit 20. More specifically, the separator 40 is a cylindrical sieve that can be rotated by a motor. The mesh of the separator 40 may be a metal screen, expanded metal made by expanding a metal sheet with slits formed therein, or punched metal having holes formed by a press in a metal sheet.

The mixing unit 50 mixes an additive including resin with classified material that past the classifier 30. Components other than the classified material and additive may also be mixed in the mixing unit 50. Note that "mixing additive with classified material" means placing the additive between fibers in the classified material inside a space (channel) of a specific volume.

The mixing unit 50 has an additive supply unit 52 that supplies additive, a conduit 53 for conveying the classified material and additive, and a blower 54. In FIG. 2 the additive is supplied from the additive supply unit 52 to the conduit 53. Alternatively, the additive may be supplied to the funnel-shaped conveyance unit 51. In this event, the funnel-shaped conveyance unit 51 is included in the mixing unit 50. Because the second conveyance channel 37b is connected to the mixing unit 50 through the funnel-shaped conveyance unit 51, the second conveyance channel 37b and mixing unit 50 are also considered to be connected.

The mixing unit 50 produces an air flow with the blower 54, and can convey while mixing the classified material and additives in the conduit 53. Note that the mechanism for mixing the classified material and additive is not specifically limited, and may mix by means of blades turning at high speed as in a juice blender, or may use rotation of the container like a V blender. The mixture (mixture of classified material and additive) that past the mixing unit 50 is conveyed through the conduit 5 to the sieve unit 60.

A screw feeder such as shown in FIG. 2, or a disc feeder not shown, is used as the additive supply unit 52. By using such a feeder, variation in the amount (added amount) of the additive in the direction of the air flow can be reduced.

The additive supplied from the additive supply unit 52 includes resin for bonding fibers together. The fibers have not been bonded at the time the resin is added. The resin melts and bonds fibers when passing the forming unit 80.

The resin supplied from the additive supply unit 52 is a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination.

The additive supplied from the additive supply unit 52 may be fibrous or powder. If the additive is fibrous, the fiber length of the additive is preferably less than or equal to the fiber length of the defibrated material. More specifically, the fiber length of the additive is preferably less than or equal to 3 mm, and further preferably less than or equal to 2 mm. If the fiber length of the additive is greater than 3 mm, mixing the additive uniformly with the defibrated material may be difficult. If the additive is a powder, the particle size (diameter) of the additive is greater than or equal to 1 µm and less than or equal to 50 µm, and is more preferably greater than or equal to 2 µm and less than or equal to 20 µm. If the particle size of the additive is less than 1 µm, the cohesive force bonding the fibers of the defibrated material may drop. If the particle size of the additive is greater than 20 µm, mixing the additive uniformly with the defibrated material may be more difficult, adhesion with the defibrated material drops and the additive may separate from the defibrated material, and irregularities may result in the manufactured sheet.

The amount of additive that is supplied from the additive supply unit 52 is set appropriately according to the type of sheet to be made. Depending on the type of sheet being manufactured, the additive may also include a coloring agent for coloring the fiber, an anti-blocking agent to prevent fiber agglomeration, or a flame retardant for making the fiber difficult to burn, in addition to resin for bonding fibers.

The mixture from the mixing unit 50 is introduced to the sieve unit 60 from the inlet 61 and distributed while precipitating in air. In the example in the figure, the mixture precipitating from the sieve unit 60 is air-laid to form a web W in the deposition unit 70.

The sieve unit 60 detangles interlocked defibrated material (fiber). When the resin in the additive supplied from the additive supply unit 52 is fibrous, the sieve unit 60 also detangles the interlocked resin. The sieve unit 60 also works to uniformly lay the mixture in the deposition unit 70.

A sieve (screen) can be used as the sieve unit 60. The sieve unit 60 has mesh (filter, screen), and can separate fiber or particles smaller than the size of the openings in the mesh (that pass through the mesh) contained in the mixture that past the mixing unit 50 from fiber, undefibrated shreds, and clumps that are larger than the openings in the mesh (that do not pass through the mesh). The sieve unit 60 thus passes the mixture from the mixing unit 50 through many openings. Material that passes the mesh is air-laid in the deposition unit 70, and material that does not pass the mesh is collected through the conduit 6 from the discharge port 62. Material that does not pass the mesh may be returned to the defibrating unit 20. More specifically, the sieve unit 60 is a cylindrical sieve that can be rotated by a motor. The mesh of the sieve unit 60 may be a metal screen, expanded metal made by expanding a metal sheet with slits formed therein, or punched metal having holes formed by a press in a metal sheet.

Note that the sieve of the sieve unit 60 may be configured without functionality for selecting specific material. More specifically, the "sieve" used in the sieve unit 60 means a device having mesh (filter, screen), and the sieve unit 60 may cause all of the mixture (the mixture that past the mixing unit 50) introduced to the sieve unit 60 to precipitate.

The deposition unit 70 lays the precipitate that past the mesh of the sieve unit 60. The deposition unit 70 includes, for example, a conveyor unit 71, tension rollers 72, and a suction mechanism 73.

The conveyor unit 71 is moving while precipitate that has past through the mesh of the sieve unit 60 accumulates thereon. The conveyor unit 71 is, for example, a mesh belt. Mesh that is tensioned by tension rollers 72 is formed in the mesh belt. The conveyor unit 71 moves when the tension rollers 72 rotate. A web W of a uniform thickness is formed on the conveyor unit 71 by the precipitate passing through the sieve unit 60 accumulating continuously while the conveyor unit 71 moves continuously.

The conveyor unit 71 may be made of metal, plastic, cloth, or nonwoven cloth, and may be configured in any way enabling air to pass through and deposit precipitate that past the sieve unit 60 thereon. The hole size (diameter) of the mesh belt is, for example, greater than or equal to 60 μm and less than or equal to 250 μm. If the hole size is less than 60 μm, it is difficult for the suction mechanism 73 to maintain a stable flow of air. If the hole size of the mesh belt is greater than 250 μm, fibers in the mixture may enter the mesh and irregularities in the surface of the manufactured sheet may increase in size. The suction mechanism 73 is configured by forming an air-tight box with a window of a desirable size below the conveyor unit 71, and pulling air in through the window so that the pressure inside the box is lower than the ambient pressure.

The suction mechanism 73 is disposed below the conveyor unit 71 (on the opposite side as the sieve unit 60). The suction mechanism 73 produces a downward flow of air (air flow directed from the sieve unit 60 to the conveyor unit 71). The mixture distributed in air by the sieve unit 60 can be suctioned onto the conveyor unit 71 by the suction mechanism 73. The mixture distributed in air can therefore be suctioned, and the discharge speed from the sieve unit 60 can be increased. As a result, the productivity of the sheet manufacturing apparatus 100 can be increased. A downward air flow can also be created in the descent path of the mixture, and interlocking of defibrated material and additive during descent can be prevented, by the suction mechanism 73. Note that particulate that passes through the mesh belt is discharged through a conduit 7 to the outside by the suction produced by the suction mechanism 73.

A soft, fluffy web W containing much air is formed as described above by material passing through the sieve unit 60 and deposition unit 70 (web forming process). Next, as shown in FIG. 2, the web W laid on the conveyor unit 71 is conveyed by the rotational travel of the deposition unit 70. The web W laid on the conveyor unit 71 is then conveyed to the forming unit 80.

Note that a moisture content adjustment unit 77 for adjusting the moisture content of the web W is disposed in the example shown in the figure. Moisture content adjustment means adding water or water vapor to the web W to adjust the water to web W ratio. When a water mister is used in the moisture content adjustment unit 77, adding water for moisture content adjustment includes adding moisture by misting water, misting an aqueous solution containing water as the solvent, and misting a dispersion of which water is the dispersion medium. Water vapor (steam) may also be used to add water to adjust the moisture content. The moisture content adjustment unit 77 adds water to the web W. When the web W is heated in the forming unit 80 after adjusting the moisture content, hydrogen bonds between the fibers of the resulting sheet S are efficiently induced by evaporating at least some of the water added by the moisture content adjustment unit 77.

The forming unit 80 applies heat and pressure to the web W laid in the deposition unit 70 (on the conveyor unit 71), forming a sheet. The forming unit 80 includes a calender 82, first cutting unit 84, heat unit 86, and second cutting unit 88.

The calender 82 compresses without heating the web W conveyed through the transfer unit not shown. The calender 82 therefore does not have a heater or other heating means. More specifically, the calender 82 is a configuration that applies a calendering process.

By applying pressure (compressing) the web W, the calender 82 increases the density of the web W, and can increase the strength of the web W and manufactured sheet. As shown in FIG. 2, the calender 82 is configured to hold and apply pressure to the web W between rollers, and comprises a pair of calendar rolls 83.

Because the calender 82 only compresses and does not heat, resin in the mixture does not melt. The web W is compressed and the gaps (distance) between fibers in the web W are shortened in the calender 82. More specifically, a high density web W is formed. Note that the calender 82 may be omitted.

The first cutting unit 84 cuts the web W after compression by the calender 82. The first cutting unit 84 has a cutter and cuts the web W perpendicularly to the conveyance direction of the web W, for example. The web W cut by the first cutting unit 84 is conveyed to the heat unit 86.

By heating the mixture of defibrated material and additive mixed in the web W, the heat unit 86 binds fibers in the mixture through the additive. When one of the resins that is part of the additive is a thermoplastic resin, the resin softens or melts when heated to the glass transition temperature (softening point) or a temperature near or exceeding the melting point (in the case of a crystalline polymer), and hardens when the temperature then drops. The resin softens to contact and interlock with the fibers, and the fiber and additive can then be bonded together by the resin hardening. Fibers are also bonded by bonding with other fibers when the resin hardens. If the resin in the additive is a thermoset resin, fiber and resin can be bonded by heating to a temperature greater than or equal to the softening point, or heating to or above the curing temperature (the temperature at which the curing reaction occurs). Note that the melting point, softening point, and curing temperature of the resin, for example, are preferably lower than the melting point, decomposition temperature, and carbonization temperature of the fiber, and both types of materials are preferably combined to achieve this relationship.

Specific configurations that may be used as the heat unit 86 include, for example, a heat roller (heater roller), hot press molding machine, hot plate, hot air blower, infrared heater, or flash fuser. In the example shown in the figure, the heat unit 86 is configured to hold, heat and compress the web W between rollers, and comprises a pair of heat rollers 87. In the example shown in the figure, the heat unit 86 has a first heat unit 86a and a second heat unit 86b, and the first heat unit 86a and second heat unit 86b each comprise a pair of heat rollers 87. Compared with configuring the heat unit 86 with a flat press (flat press machine), configuring the heat unit 86 with heat rollers 87 enables forming a sheet while continuously conveying the web W. Note that the number of heat rollers 87 is not specifically limited.

In addition to configurations using rollers, the heat unit 86 can also be configured with a flat press device.

While the heat unit 86 of the sheet manufacturing apparatus 100 also compresses the web W, the pressure applied by the calender 82 is preferably set greater than the pressure applied by the heat unit 86. By setting the pressure applied by the calender 82 greater than the heat unit 86, the distance between the fibers in the web W can be shortened by the calender 82, and high density, high strength paper can be formed by heating and compressing the web W after calendering. The sheet manufacturing apparatus 100 may also compress the web after heating.

The second cutting unit 88 cuts the web W that was heated in the heat unit 86 (the web W having past the heat unit 86 is a sheet S). The second cutting unit 88 has a cutter, and cuts the sheet S on both sides along the conveyance direction of the sheet S. The sheet S cut in the second cutting unit 88 is then stacked in a stacker not shown. The cutoffs from both sides are collected in a hopper 89.

The control unit 90 changes a condition of at least one of the classifier 30, mixing unit 50, sieve unit 60, and deposition unit 70. The control unit 90 may also change a condition of the supply unit 10, defibrating unit 20, separator 40, and forming unit 80 (more specifically, the calender 82 and heat unit 86). The control unit 90 is described more specifically below.

1.2. Control Unit

The control unit 90 can change a condition of the supply unit 10. More specifically, the sheet manufacturing apparatus 100 has multiple supply units 10 (automatic loaders) that supply different materials, one of the multiple supply units 10 operates based on a signal from the control unit 90, and material is supplied to the shredder 12 from the supply unit 10 that is operated. Yet more specifically, this sheet manufacturing apparatus 100 has three supply units 10 (first supply unit, second supply unit, third supply unit), and can supply recovered paper that has been printed on from the first supply unit, supply pulp sheet from the second supply unit, and supply old clothing (polyester fiber) from the third supply unit. By thus selecting the supply unit 10 that operates, sheets with various different characteristics can be manufactured in the sheet manufacturing apparatus 100. Note that the sheet manufacturing apparatus 100 may be configured without a supply unit 10, and the material that is supplied may be changed manually.

The control unit 90 can also change the supply speed of the supply unit 10 (the speed at which material is supplied to the shredder 12). More specifically, the speed of the conveyance roller 11 (the roller for supplying material to the shredder 12) changes and the supply speed changes based on a signal from the control unit 90. As a result, the thickness and density of the sheet manufactured in the sheet manufacturing apparatus 100 can be changed.

The control unit 90 can also change a condition of the shredder 12. More specifically, the speed of the shredder blades 14 of the shredder 12 changes based on a signal from the control unit 90. As a result, the size of the shreds the shredder 12 produces from the feedstock changes, and the density and strength of the sheet manufactured by the sheet manufacturing apparatus 100 can be changed.

A shredder 12 may be disposed for each of the multiple supply units 10, and one of the multiple shredders 12 may be operated based on a signal from the control unit 90. This enables shredding different materials with specialized shredders 12.

The control unit 90 can also change a condition of the defibrating unit 20. More specifically, the rotational speed of the rotating part (rotor) of the defibrating unit 20 changes in the defibrating unit 20 based on a signal from the control unit 90. As a result, the fiber length of the defibrated material defibrated in the defibrating unit 20 can be changed. The length of the fibers is longer when the rotational speed of the defibrating unit 20 is low than when high, and the strength of the manufactured sheet can be increased.

The control unit 90 can also change a condition of the classifier 30. More specifically, the first valve 38a and second valve 38b open and close based on signals from the control unit 90. The control unit 90 can select the first conveyance channel 37a through the classifying unit 31, or the second conveyance channel 37b not passing the classifying unit 31. For example, if the first valve 38a is closed and the second valve 38b is open, defibrated material defibrated in the defibrating unit 20 is transported through the second conveyance channel 37b to the funnel-shaped funnel-shaped conveyance unit 51 without passing the classifying unit 31. If the feedstock is pulp sheet instead of recovered paper, there are no resin particles or ink particles, and there is no need for the feedstock to pass the classifying unit 31. Fiber being removed as a result of passing the classifying unit 31 can also be suppressed. However, if the first valve 38a is open and the second valve 38b is closed, the defibrated material defibrated in the defibrating unit 20 passes the first conveyance channel 37a and passes the classifying unit 31. Because there are resin particles and ink particles if the feedstock is recovered paper, the feedstock preferably passes the classifying unit 31 to remove resin particles and ink particles. The color of the manufactured sheet is therefore good, the fiber ratio can be improved, and high strength sheets can be made. The sheet manufacturing apparatus 100 can thus manufacture sheets from different materials using conditions appropriate to the material.

The control unit 90 can also change a condition of the separator 40. More specifically, the third valve 38c and fourth valve 38*d* open and close based on signals from the control unit 90. For example, when the third valve 38*c* is open and the fourth valve 38*d* is closed, the classified material classified by the classifying unit 31 is conveyed through the third conveyance channel 37*c* to the separator 40. If the third valve 38*c* is closed and the fourth valve 38*d* is open, the classified material classified in the classifying unit 31 does not pass the separator 40, and is conveyed through the fourth conveyance channel 37*d* and second conveyance channel 37*b* to the mixing unit 50.

The control unit 90 may also change the rotational speed of the separator 40, which is a rotary sieve. As a result, the fiber length of the defibrated material passing the separator 40 can be changed, and the strength and density of the sheets manufactured in the sheet manufacturing apparatus 100 can be changed. Longer fibers can be passed when the speed of the separator 40 is fast than when slow, and the strength and density of the manufactured sheets increase.

The control unit 90 can also adjust a condition of the mixing unit 50. More specifically, the sheet manufacturing apparatus 100 has a plurality of additive supply units 52 each supplying a different additive, one of the multiple additive supply units 52 operates (a screw feeder operates) based on a signal from the control unit 90, and additive is supplied to the conveyance unit 51 from the additive supply unit 52 that is operated. The mixing unit 50 can therefore mix different additives, and the control unit 90 select and mix one of different additives. More specifically, the sheet manufacturing apparatus 100 has four additive supply units 52 (first additive supply unit, second additive supply unit, third additive supply unit, fourth additive supply unit). Resin particles integrating titanium oxide particles with polyester resin and having a volume mean particle diameter d50=10 μm are supplied from the first additive supply unit. Colored resin particles integrating copper phthalocyanine blue pigment with polyester resin and having a volume mean particle diameter d50=10 μm are supplied from the second additive supply unit. Polymer fiber, which is a 1.7 dtex melt-spun fiber (Tetron, Teijin Ltd.) having a sheath-core structure where the sheath is polyethylene, which melts at 100° C. or higher, and the core is polyester, is supplied from the third additive supply unit. Aluminum hydroxide B53 (Nippon Light Metal) is supplied as a flame retardant from the fourth additive supply unit.

The sheet manufacturing apparatus 100 may also be configured with one additive supply unit 52, and the downstream manufacturing process (such as the pressure of the calender 82 and the temperature of the heat unit 86) changed automatically according to the content of the additive supplied from the additive supply unit 52. For example, a signal may be output to the control unit 90 from a cartridge that is loaded with additive and is installed to the additive supply unit 52, and the control unit 90 may control the calender 82 and heat unit 86 based on the signal from the cartridge. As a result, suitable conditions (such as the pressure of the calender 82) can be automatically selected according to the additive supplied from the additive supply unit 52. The cartridge loaded with additive may be manually replaced.

The control unit 90 may also change a condition of the sieve unit 60. More specifically, the sieve unit 60, which is a rotary sieve, is configured with a replaceable screen. For example, screens with different sizes of screen openings may be provided as cassettes, and the control unit 90 may direct which screen to install to the sieve unit 60. More specifically, the sieve unit 60 may have a first sieve unit with mesh of a first size, and a second sieve with mesh of a second size that is larger than the first size; and the control unit 90 may select the first sieve or the second sieve according to the type of sheet to be produced. The fiber length of the defibrated material that passes the sieve unit 60 can therefore be changed, and the strength and density of the sheets manufactured by the sheet manufacturing apparatus 100 can be changed. Note that the screen of the sieve unit 60 is manually changed, but may be changed automatically. Density can be increased, and strength can be increased, by using a sieve unit 60 with small mesh instead of large mesh.

Note that the sheet manufacturing apparatus 100 may be configured with multiple sieve units 60 having different sizes of screen openings and wire diameters, and the sieve unit 60 that is used may be selected by switching the conduit conveying the mixture that past the mixing unit 50.

The control unit 90 may also change the rotational speed of the sieve unit 60, which is a rotary sieve. As a result, the length of fiber in the defibrated material that passes the sieve unit 60 can be changed, and the strength and density of the sheet manufactured by the sheet manufacturing apparatus 100 can be changed.

The control unit 90 can also change a condition of the deposition unit 70. More specifically, based on a signal from the control unit 90, the deposition unit 70 changes the rotational speed of the tension rollers 72, and changes the speed of the conveyor unit 71. The control unit 90 can variably control the speed of the conveyor unit 71. Specifically, the thickness of the web W increases when the conveyor unit 71 moves slowly rather than fast. As a result, the thickness of the sheet manufactured in the sheet manufacturing apparatus 100 can be increased or the density can be increased.

The control unit 90 can also change a condition of the calender 82. More specifically, the pressure applied to the web W by the calender 82 changes based on a signal from the control unit 90. For example, the pressure applied to the web W by the calender 82 changes by changing the distance between the pair of calendar rolls 83 based on a signal from the control unit 90. As a result, the density and strength of the sheet manufactured in the sheet manufacturing apparatus 100 can be changed. When the pressure applied to the web W is high, the thickness of the manufactured sheet can be decreased, or the density of the sheet increased, compared with when the applied pressure is low.

The control unit 90 can also change a condition of the heat unit 86, for example. More specifically, in the heat unit 86, the temperature of the heat unit 86 changes based on a signal from the control unit 90. As a result, the density of sheets manufactured in the sheet manufacturing apparatus 100 can be changed. The control unit 90 controls changing at least one of the applied pressure and heat temperature by the forming unit 80 changing at least one of the applied pressure and heating temperature.

While not shown in the figures, the sheet manufacturing apparatus 100 may have multiple forming units 80. The plural forming units 80 have different numbers of rollers 83, 87. As a result, the time the web W is compressed and the time the web W is heated can be changed. For example, the number of heat rollers 87 may be increased when the web W is relatively thick because heat transmission through the web W is difficult. One of the plural forming units 80 may comprise a flat press device instead of rollers 83, 87. The plural forming units 80 may also be movable so that the web can be received from the deposition unit 70 based on a signal from the control unit 90. As a result, the sheet manufacturing apparatus 100 can manufacture sheets using the forming unit 80 appropriate to the feedstock and the additive supplied from the additive supply unit 52.

The control unit 90 may be configured with a main control unit, a motor drive unit, an operating panel (operating unit), or a processing unit, for example. The operating unit is for inputting user operations, for example, as data. The operating unit is embodied by hardware such as a keyboard and touch panel, for example. The processing unit executes processes based on operating data from the operating unit or a program, for example. The processing unit is embodied by hardware such as a processor (CPU, DSP, for example) or ASIC (gate array, for example), application program, and OS (such as a general purpose OS).

Features of the sheet manufacturing apparatus 100 are described below.

The sheet manufacturing apparatus 100 has a control unit 90 that changes a condition of at least one of the classifier 30, mixing unit 50, sieve unit 60, deposition unit 70, and forming unit 80. The sheet manufacturing apparatus 100 can therefore process a variety of materials and manufacture a variety of sheets by changing conditions for manufacturing the sheets. Specifically, the sheet manufacturing apparatus 100 can manufacture sheets with different characteristics using the same materials, and can manufacture sheets having the same characteristics using different materials.

The forming unit 80 of the sheet manufacturing apparatus 100 can change at least one of the applied pressure and the heating temperature, and the control unit 90 controls changing at least one of the applied pressure and the heating temperature. Because the sheet manufacturing apparatus 100 can thus change at least one of the applied pressure and the heating temperature, the thickness, density, and texture, for example, of the manufactured sheets can be changed in a single production apparatus.

The deposition unit 70 of the sheet manufacturing apparatus 100 has a conveyor unit 71 on which precipitate is deposited while the conveyor unit 71 is moving, and the control unit 90 variably controls the speed of the conveyor unit 71. Because the sheet manufacturing apparatus 100 can change the speed of the conveyor unit 71, the thickness and density of the manufactured sheets can be changed in a single production apparatus.

The mixing unit 50 of the sheet manufacturing apparatus 100 can mix different additives, and the control unit 90 can select additives for mixing. Because the sheet manufacturing apparatus 100 can mix different additives with defibrated material, sheets with different characteristics can be manufactured using the same materials in a single production apparatus.

The sieve unit 60 of the sheet manufacturing apparatus 100 has a first sieve unit with mesh of a first size, and a second sieve unit with mesh of a second size that is larger than the first size, and the control unit 90 selects the first sieve unit or the second sieve unit. Because the sheet manufacturing apparatus 100 can change the size of the screen openings of the sieve unit 60, the length of fiber in the defibrated material that passes the sieve unit 60 can be changed, and the strength and density of the manufactured sheets can be changed in a single production apparatus.

The classifier 30 of the sheet manufacturing apparatus 100 has a classifying unit 31 for classifying material, a first conveyance channel 37a that passes the classifying unit 31, and a second conveyance channel 37b that does not pass the classifying unit 31; and the control unit 90 selects the first conveyance channel 37a passing the classifying unit 31 or the second conveyance channel 37b not passing the classifying unit 31. Because particulate such as resin and ink is not contained in the feedstock when the feedstock is pulp sheet instead of recovered paper, there is no need to pass the feedstock through the classifying unit 31. The production process can therefore be shortened by passing the defibrated material defibrated in the defibrating unit 20 through the second conveyance channel 37b, and the through-put of the sheet manufacturing apparatus 100 can be increased. To achieve good color in the manufactured paper when the feedstock is recovered paper, however, passing the classifying unit 31 is preferable. The sheet manufacturing apparatus 100 can therefore manufacture sheets from different kinds of feedstock using conditions appropriate to the feedstock that is used.

2. EXAMPLES

The invention is described more specifically below with reference to the following examples. Note that the following examples do not limit the invention in any way.

Sheets with different characteristics were manufactured in examples 1 to 11 below using a sheet manufacturing apparatus according to the invention (for example, using a sheet manufacturing apparatus 100 having multiple additive supply units 52 and multiple forming units 80). FIG. 3 is a table of the manufacturing conditions and products manufactured in each example.

2.1. Example 1

In example 1, recovered printed paper (recovered paper that has already been printed on) was supplied as the feedstock from the supply unit 10 as shown in FIG. 3. A paper shredder was used as the shredder 12, and the feedstock (recovered paper that has been printed on) supplied from the supply unit 10 was cut into shreds approximately 6 mm×14 mm.

A defibrator was used as the defibrating unit 20, which defibrated the feedstock after being shredded in the shredder 12. The speed of the defibrating unit 20 (rotational speed of the rotating part of the defibrating unit 20) was 5000 rpm.

A cyclone was used as the classifying unit 31 of the classifier 30, and classified defibrated material that past the defibrating unit 20.

A cylindrical sieve (rotary sifter) that can rotate was used as the separator 40, which sifted the classified material from the classifier 30 by fiber length. Mesh with 970 μm screen openings was used as the screen of the separator 40.

The mixing unit 50 mixed 100 parts by weight of defibrated material (fiber) that past the separator 40 with 15 parts by weight of resin particles supplied from the additive supply unit 52. A turbofan blower was used in the mixing unit 50, which mixed the defibrated material and resin in air. A screw feeder was used for the additive supply unit 52. Of the plural additive supply units 52 in example 1, the first additive supply unit for supplying resin particles was operated, and resin particles were supplied from the first additive supply unit.

A cylindrical sieve (rotary sifter) that can turn was used as the sieve unit 60, which detangled the mixture mixed in the mixing unit 50. Mesh with 970 μm screen openings was used as the screen of the sieve unit 60.

A mesh belt was used in the conveyor unit 71 of the deposition unit 70, and the suction mechanism 73 was operated to lay precipitate that past the sieve unit 60 onto the conveyor unit 71 while the conveyor unit 71 moved at normal speed. The web laid on the conveyor unit 71 was then conveyed to the forming unit 80.

Of the plural forming units 80 in example 1, a forming unit 80 with one set of calendar rolls 83 and one set of heat rollers 87 was selected to form a sheet.

Office paper was made by the process described above in example 1.

2.2. Example 2

Of the plural additive supply units 52 in example 2, the second additive supply unit, which supplied 15 parts by weight of colored resin particles, was selected and resin was supplied from the second additive supply unit. This example was otherwise identical to example 1.

Blue paper is made in example 2.

As will be understood by comparing example 1 and example 2, a sheet manufacturing apparatus 100 having multiple additive supply units 52 can make different colors of paper by selecting the additive supply unit 52 that supplies the additive. Note that the sheet manufacturing apparatus 100 may be configured with only one additive supply unit 52, and the type of additive that is supplied may be changed by replacing the cartridge (a cartridge loaded with additive) of the additive supply unit 52, for example.

2.3. Example 3

Pulp sheet was supplied as the feedstock from the supply unit 10 in example 3. Defibrated material defibrated in the defibrating unit 20 was conveyed to the mixing unit 50 without passing the classifying unit 31 and separator 40 in example 3. More specifically, the first valve 38*a* was closed, the second valve 38*b* was open, and the defibrated material was conveyed to the mixing unit 50. In addition, 100 parts by weight defibrated material (fiber), 15 parts by weight polymer fiber, and 5 parts by weight flame retardant were mixed in example 3. Of the multiple additive supply units 52, the third additive supply unit that supplies polymer fiber, and the fourth additive supply unit that supplies a flame retardant, were selected to supply. In example 3, mesh with a 3000 μm screen opening was used as the screen of the sieve unit 60. Of the multiple forming units 80 in example 3, a forming unit 80 having three sets of heat rollers 87 and no calendar rolls 83 was selected for sheet forming. This example was otherwise identical to example 1.

A waste ink sponge (absorber), oil sponge, sound insulation, and heat insulation were made in example 3.

As will be understood by comparing examples 1 and 2 with example 3, the sheet manufacturing apparatus 100 can make sheets with completely different characteristics in a single manufacturing apparatus. As described above, the sheet manufacturing apparatus 100 can make sheets with diverse functionality ranging from office paper to fluid absorption materials and sound and heat insulation materials.

2.4. Example 4

In example 4, mesh with a 5000 μm screen opening was used as the screen of the sieve unit 60. This example was otherwise identical to example 3.

A waste ink sponge (absorber), oil sponge, sound insulation, and heat insulation were made in example 4.

A screen with a larger screen opening size than in example 3 was used as the sieve unit 60 in example 4. Because large fiber agglomerations such as undefibrated material and fiber clumps were also mixed in example 4, sheets having areas of different densities can be made. As a result, waste fluid retention and sound absorption can be improved. By thus changing a condition of the sieve unit 60, the sheet manufacturing apparatus 100 in this example can make absorption materials containing undefibrated material and fiber clumps, as well as absorption materials not containing undefibrated material and fiber clumps.

2.5. Example 5

In example 5, waste paper that was previously printed on was supplied as the feedstock from the supply unit 10. This example was otherwise identical to example 3.

A waste ink sponge (absorber), oil sponge, sound insulation, and heat insulation were made in example 5.

2.6. Example 6

In example 6, defibrated material defibrated in the defibrating unit 20 was conveyed to the classifying unit 31, and the classified material classified by the classifying unit 31 was conveyed to the mixing unit 50 without passing the separator 40. More specifically, the first valve 38*a* and fourth valve 38*d* were open, the second valve 38*b* and third valve 38*c* were closed, the defibrated material was conveyed to the classifying unit 31, and the classified material classified by the classifying unit 31 was conveyed to the mixing unit 50. This example was otherwise identical to example 5.

A waste ink sponge for pigment was made in example 6.

Because the defibrated material past through the classifying unit 31 in example 6, inorganic components such as calcium carbonate contained in recovered paper that was previously printed on were removed. As a result, agglomeration of dispersion inks is difficult and the ink sponge produced in example 6 is suitable as an absorption material for pigment inks. Furthermore, because small particulate material such as calcium carbonate was removed, the ink sponge of example 6 was able to make an ink absorption material with little material loss. As will be understood by comparing example 5 and example 6, the sheet manufacturing apparatus 100 can make ink absorption materials with different characteristics by changing a condition of the classifier 30.

2.7. Example 7

A forming unit 80 having one set of heat rollers 87 was selected from the multiple forming units 80 in example 7. This example was otherwise identical to example 5.

A waste ink sponge (absorber), oil sponge, sound insulation, and heat insulation were made in example 7.

Because the heating time of the web is shorter in example 7 than in example 5, there is a difference in the degree of resin bonding (degree of curing) between the surface and the center of the thickness of the manufactured sheet, and differences in density resulted in the manufactured sheet. More specifically, a density distribution in which the center of the sheet is less dense than the surface was formed. Fluid absorption and retention can be improved by this density difference. The sheet manufacturing apparatus 100 in this example can therefore manufacture absorption materials with different densities by changing a condition of the forming unit 80.

2.8. Example 8

The speed of the conveyor unit 71 in the deposition unit 70 in example 8 is twice the speed of the conveyor unit 71 in example 5. This example was otherwise identical to example 5.

A waste ink sponge (absorber), oil sponge, sound insulation, and heat insulation were made in example 8.

The amount of material laid into a web on the conveyor unit 71 (the amount deposited per unit area of the conveyor unit 71) in example 8 was half the amount deposited in example 5. As a result, if a condition of the forming unit 80 is not changed (if forming the same thickness), the density of the manufactured sheet can be made half the density of the sheet in example 5. If the forming unit 80 forms the same thickness as in example 5, the thickness of the manufactured sheet is ½ and the manufactured sheet is thinner. Note that the amount of material laid into a web on the conveyor unit 71 can be changed by changing the amount of material (fiber, additive) introduced per unit time, or the rotational speed of the rotary sieve of the sieve unit 60.

2.9. Example 9

Of the multiple additive supply units 52 in example 9, the third additive supply unit that can supply 15 parts by weight of polymer fiber was selected instead of the fourth additive supply unit that supplies flame retardant, and polymer fiber was supplied from the third additive supply unit. Also in example 9, a forming unit 80 having two sets of heat rollers 87 and no calendar rolls 83 was selected from among the multiple forming units 80. This example was otherwise identical to example 8.

Tissue paper for cleaning (cleaning wipes) was made in example 9.

As will be understood by comparing example 8 and example 9, a sheet manufacturing apparatus 100 having multiple additive supply units 52 can make sheets with different characteristics by selecting the additive supply unit 52 that supplies.

2.10. Example 10

In example 10, the polymer fiber supplied from the additive supply unit 52 was 25 parts by weight. Of the multiple forming units 80 in example 10, a forming unit 80 having three sets of heat rollers 87 and no calendar rolls 83 was selected. This example was otherwise identical to example 9.

Tissue cleaning paper for cleaning up oil was made in example 10.

The amount of resin supplied was greater and the percentage of resin was higher in example 10 than example 9. As a result, example 10 was able to manufacture sheets with high lipophilicity that are effective for wiping up oil. The sheet manufacturing apparatus 100 can thus manufacture different types of tissue paper for cleaning with different characteristics.

2.11. Example 11

In example 11, old clothing (polyester fiber) was supplied as the feedstock from the supply unit 10. The rotational speed of the defibrating unit 20 in example 11 was 6000 rpm. The polymer fiber (sheath-core structure melt resin) supplied from the additive supply unit 52 in example was 20 parts by weight. This example was otherwise identical to example 9.

Example 11 manufactured tissue cleaning paper for cleaning.

As will be understood by comparing example 9 and example 11, the sheet manufacturing apparatus 100 can make sheets with the same characteristics from different types of feedstock.

Sheets manufactured by this sheet manufacturing apparatus 100 are primarily in the form of a sheet. The invention is not limited to making sheets, however, and may make paperboard and web forms. Sheets as referred to herein are separated into paper and nonwoven cloth. Paper includes products formed into thin sheets from pulp or recovered paper as the feedstock, and includes recording paper for handwriting and printing, wall paper, packaging paper, color paper, drawing paper, and bristol paper, for example. Nonwoven cloth includes products that are thicker or have lower strength than paper, and includes common nonwoven cloth, fiberboard, tissue paper (tissue paper for cleaning), kitchen paper, cleaning paper, filter paper, liquid (waste ink and oil) absorption materials, sound absorption materials, heat insulation, cushioning materials, and mats, for example. The feedstock may also be cellulose or other type of plant fiber, synthetic fiber such as PET (polyethylene terephthalate) and polyester, or wool, silk, or other animal fiber.

Words meaning uniform, same, and similar terms meaning that density, distance, dimensions, and similar terms are equal are used herein. These are preferably equal, but include values deviating without being equal due to the accumulation of error, deviation, and such because achieving complete equality is difficult.

The invention includes configurations that are effectively the same as the configurations described above (configurations of the same function, method, and result, or configurations of the same objective and effect). The invention also includes configurations that replace parts that are not essential to the configuration described in the foregoing embodiment. Furthermore, the invention includes configurations having the same operating effect, or configurations that can achieve the same objective, as configurations described in the foregoing embodiment. Furthermore, the invention includes configurations that add technology known from the literature to configurations described in the foregoing embodiment.

REFERENCE SIGNS LIST 1, 2, 3, 4, 5, 6, 7 conduit
10 supply unit
11 conveyance roller
12 shredder
14 shredder blades
20 defibrating unit
21 inlet port
22 discharge port
30 classifier
31 classifying unit
32 inlet port
33 cylinder
34 conical section
35 bottom discharge port
36 top discharge port
37a first conveyance channel
37b second conveyance channel
37c third conveyance channel
37d fourth conveyance channel
38a first valve
38b second valve
38c third valve
38d fourth valve
40 separator
41 inlet
42 discharge port
50 mixing unit 51 funnel-shaped conveyance unit
52 additive supply unit
53 conduit
54 blower
60 sieve unit
61 inlet port
62 discharge port
70 deposition unit
71 conveyor unit
72 tension rollers
73 suction mechanism
75 mesh belt
76 tension roller
77 moisture content adjustment unit
80 forming unit
82 calender
83 calendar rolls
84 first cutting unit
86 heat unit
86a first heat unit
86b second heat unit
87 heat rollers
88 second cutting unit
89 hopper
90 control unit
100 sheet manufacturing apparatus

The invention claimed is:

1. A sheet manufacturing apparatus comprising:
a supply unit that supplies feedstock;
a defibrating unit that defibrates the feedstock;
an additive supply unit that supplies an additive containing resin, a plurality of cartridges that are loaded with, the additive, different additives that include different colors and different materials from each other being provided, the plurality of cartridges being configured to output a signal;
a mixing unit that mixes the additive with defibrated material that has passed through the defibrating unit;
a sieve unit that passes the mixture that has passed through the mixing unit through numerous openings;
a deposition unit that deposits precipitate that has passed through numerous openings of the sieve unit;
a forming unit that applies heat and pressure to the web deposited in the deposition unit, and forms a sheet; and
a control unit that is configured to change a condition of at least one of the mixing unit, the sieve unit, and the deposition unit depending on color and material of the additive based on the signal from the cartridges.

2. The sheet manufacturing apparatus described in claim 1, wherein:
the forming unit changes at least one of the applied pressure and the heating temperature, and the control unit variably controls at least one of the applied pressure and the heating temperature.

3. The sheet manufacturing apparatus described in claim 1, wherein:
the deposition unit has a conveyor unit that moves while the precipitate is deposited thereon, and the control unit variably controls the speed of the conveyor unit.

4. The sheet manufacturing apparatus described in claim 1, wherein:
the mixing unit mixes different additives, and the control unit causes the mixing unit to select and mix one of the different additives.

5. The sheet manufacturing apparatus described in claim 1, wherein:
the sieve unit has a first sieve unit with mesh of a first size, and a second sieve with mesh of a second size that is larger than the first size; and the control unit selects the first sieve or the second sieve.

6. The sheet manufacturing apparatus described in claim 1, further comprising a classifier that classifies the defibrated material that has passed through the defibrating unit, wherein
the classifier has a classifying unit that classifies material, a conveyance channel that passes the classifying unit, and a conveyance channel that does not pass the classifying unit; and the control unit selects the conveyance channel passing the classifying unit or the conveyance channel not passing the classifying unit.

* * * * *